(12) United States Patent
Madawala et al.

(10) Patent No.: US 12,316,121 B2
(45) Date of Patent: May 27, 2025

(54) VEHICLE-GRID-HOME POWER INTERFACE

(71) Applicant: Auckland Uniservices Limited, Auckland (NZ)

(72) Inventors: Udaya Kumara Madawala, Auckland (NZ); Lei Wang, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 426 days.

(21) Appl. No.: 17/592,952

(22) Filed: Feb. 4, 2022

(65) Prior Publication Data

US 2022/0231509 A1 Jul. 21, 2022
US 2022/0393472 A9 Dec. 8, 2022

Related U.S. Application Data

(63) Continuation of application No. PCT/IB2020/057750, filed on Aug. 17, 2020.

(30) Foreign Application Priority Data

Aug. 16, 2019 (NZ) .......................... 756443

(51) Int. Cl.
*H02J 3/32* (2006.01)
*B60L 55/00* (2019.01)
(Continued)

(52) U.S. Cl.
CPC .............. *H02J 3/322* (2020.01); *B60L 55/00* (2019.02); *H02J 3/36* (2013.01);
(Continued)

(58) Field of Classification Search
CPC ................. H02J 3/322; B60L 55/00
(Continued)

(56) References Cited

U.S. PATENT DOCUMENTS

2011/0199045 A1* 8/2011 Hui .................... H02M 3/3376
320/108
2011/0254377 A1 10/2011 Wildmer et al.
(Continued)

FOREIGN PATENT DOCUMENTS

DE 10 2014 220224 A1 4/2016
EP 3113329 A1 1/2017
(Continued)

OTHER PUBLICATIONS

International Search Report and Written Opinion in counterpart International Application No. PCT/IB2020/057750, mailed Oct. 29, 2020, 19 pages.
(Continued)

*Primary Examiner* — Daniel Cavallari
*Assistant Examiner* — Dru M Parries
(74) *Attorney, Agent, or Firm* — Edell, Shapiro & Finnan, LLC

(57) ABSTRACT

A method of operating an electric vehicle charging apparatus for a vehicle to grid interface comprising a first full bridge converter configured to convert a grid supply to a DC link and a primary full bridge converter connected to the DC link and configured to provide an output alternating current for use in vehicle charging. The method includes detecting a charging power requirement for a vehicle; determining a required voltage for the DC link to enable the converter to supply power for satisfying the charging power requirement when operating at full duty cycle; operating the primary full bridge converter at full duty cycle; controlling the voltage of the DC link to the required voltage.

14 Claims, 14 Drawing Sheets

(51) Int. Cl.
    *H02J 3/36*        (2006.01)
    *H02J 7/00*        (2006.01)
    *H02M 3/335*     (2006.01)

(52) U.S. Cl.
    CPC ................ *H02J 7/007182* (2020.01); *H02M 3/33573* (2021.05); *H02J 2003/365* (2013.01)

(58) Field of Classification Search
    USPC .......................................................... 307/22
    See application file for complete search history.

(56) References Cited

U.S. PATENT DOCUMENTS

2011/0254379 A1    10/2011    Madawala
2020/0280190 A1*    9/2020    Lehn .................... H02J 7/1423

FOREIGN PATENT DOCUMENTS

| EP | 3163704 A1 | 5/2017 |
|---|---|---|
| WO | 2011/127449 A2 | 10/2011 |
| WO | 2013/002651 A1 | 1/2013 |
| WO | 2019/071360 A1 | 4/2019 |
| WO | 2020/049801 A1 | 3/2020 |

OTHER PUBLICATIONS

Extended European Search Report in counterpart European Application No. 20853781.1-1012, mailed Aug. 28, 2023, 7 pages.

* cited by examiner

The operation modes of proposed system (A) APF mode
(b) Islanding mode/V2H (c) G2VH (d) VG2H (e) V2HG Steady state waveforms of the proposed VW-VGH-PI under different modes (a) from VG2H to islanding mode (b) from VG2H to G2HV (c) from V2GH to V2H

VEHICLE-GRID-HOME POWER INTERFACE

FIELD

The subject matter disclosed herein relates to power systems, particularly those used in grid-home interfaces, or home power interfaces that include a connection to another power source or load, such as a battery or an electric vehicle having a battery or vehicle to vehicle interfaces. Although this document refers to home and household loads, it will be understood that in some applications the disclosed subject matter may be relevant to other electrical loads.

BACKGROUND

The use of batteries as a means to store energy for use in electric vehicles or for powering household loads such as home appliances or even industrial loads is becoming more common.

Also, the use of magnetic coupling as a safe and efficient mechanism for transferring power wirelessly at high power levels is now commercially possible. At present, wireless power transfer (WPT) technology is used for charging electric vehicles, and offers considerable advantages in terms of safety and convenience.

The energy stored in home or vehicle batteries is a source of energy that can be used to manage energy with greater flexibility or to provide grid services in an efficient and cost effective manner, for example by powering loads such as domestic appliances at times of high demand on the utility network, or possibly supplying power from the home or vehicle battery back to the utility network (otherwise known as the grid) or powering houses or essential loads during power outages or emergency situations.

For such examples or applications there is a need for an efficient bidirectional interface between the grid, wirelessly coupled power sources and loads that may be supplied or received by either the grid or the wirelessly coupled source.

However, there are still a number of technical difficulties that need addressing in order to improve both the versatility and efficiency of the power interface as well as to comply with the standards and keep the overall cost low. Wireless power transfer (WPT) technologies normally operate at high switching frequency, leading to significant switching/power losses. Other problems include harmonics and power factor issues, supplying power to non-linear loads, managing energy supply and demands amongst sources and loads within constrains and lowering the number of components or conversion stages used etc.

SUMMARY

The disclosed subject matter provides an adaptive DC-link voltage control method for application to a versatile wireless power interface such as a Versatile Wireless Vehicle-Grid-Home Power Interface (VW-VGH-PI). A new wireless power interface topology is also disclosed, comprising a power & quality control converter (PQCC) between the grid and the wireless power transfer (WPT) system. New operating modes for a VW-VGH-PI are also disclosed for active power interchange, and reactive and harmonic power compensation. These include an islanding mode, an active power filter (APF) mode, a grid to vehicle-home (G2VH) mode, a vehicle-grid-to-home (VG2H) mode, a vehicle-to-home (V2H) mode and a vehicle-to-vehicle (V2V) mode.

The disclosed subject matter also includes control strategies, methods and systems to use the disclosed topology to provide power quality compensation.

In one aspect the disclosure provides a method of operating an electric vehicle charging apparatus comprising a first full bridge converter configured to convert a grid supply to a DC link and a primary full bridge converter connected to the DC link and configured to provide an output alternating current for use in vehicle charging, the method comprising:

detecting a charging power requirement for a vehicle to be charged by the apparatus;

determining a required voltage for the DC link to enable the primary full bridge converter to supply power for satisfying the charging power requirement when the primary full bridge converter is operating at full duty cycle;

operating the primary full bridge converter at full duty cycle;

controlling the voltage of the DC link to the required voltage.

Preferably the method further comprises charging the vehicle wirelessly.

Preferably the method further comprises providing a bi-directional wireless coupling between the primary full bridge converter and the vehicle.

Preferably the method further comprises supplying the output of the primary full bridge converter to a coil for coupling to a further coil of the vehicle for inductive coupling to enable wireless power transfer.

Preferably the method further comprises detecting a reactive power requirement of a load connected to the grid, and; operating the first full bridge converter to compensate for the reactive power requirement.

Preferably the method further comprises detecting a power requirement of the load or grid and operating the first and primary full bridge converters to supply power from the vehicle to the load and/or the grid.

Preferably the method further comprises controlling the primary full bridge converter and a secondary full bridge converter associated with the vehicle to control bi-directional wireless power transfer between the grid, load and vehicle.

Preferably the method includes operating the primary and secondary converters at a relative phase angle ($\theta$) to direct power flow to or form the vehicle. Preferably $\theta$ is +90 degrees or -90 degrees.

Preferably the method further comprises operating the duty cycle ($\varphi_p$) of the of the primary converter at 180 degrees.

Preferably the method further comprises operating the duty cycle ($\varphi_s$) of the secondary converter to control power flow.

Preferably the method further comprises calculating an instantaneous load power, determining a reference current for supply by the first full bridge converter, and controlling switches of the first full bridge converter to provide compensation.

In another aspect the disclosure provides a method of operating an electric vehicle charging apparatus comprising a first full bridge converter connected to the grid and configured to convert a grid supply to a DC link and a second full bridge converter connected to the DC link and configured to provide an output alternating current for use in vehicle charging, the method comprising:

detecting a reactive power requirement of a load connected to the grid;

operating the first full bridge converter to compensate for the reactive power requirement.

Preferably the method further comprises detecting a charging power requirement for a vehicle to be charged by the apparatus, and operating the second converter to charge the vehicle.

Preferably the method further comprises detecting a power requirement of the load or grid and operating the first and second full bridge converters to supply power from the vehicle to the load and/or the grid.

Preferably the method further comprises charging the vehicle wirelessly.

Preferably the method further comprises providing a bi-directional wireless coupling between the primary full bridge converter and the vehicle.

Preferably the method further comprises supplying the output of the primary full bridge converter to a coil for coupling to a further coil of the vehicle for inductive coupling to enable wireless power transfer.

Preferably the method further comprises detecting a reactive power requirement of a load connected to the grid, and; operating the first full bridge converter to compensate for the reactive power requirement.

Preferably the method further comprises detecting a power requirement of the load or grid and operating the first and primary full bridge converters to supply power from the vehicle to the load and/or the grid.

Preferably the method further comprises controlling the primary full bridge converter and a secondary full bridge converter associated with the vehicle to control bi-directional wireless power transfer between the grid, load and vehicle.

Preferably the method includes operating the primary and secondary converters at a relative phase angle (θ) to direct power flow to or form the vehicle. Preferably θ is +90 degrees or −90 degrees.

Preferably the method further comprises operating the duty cycle (φp) of the of the primary converter at 180 degrees.

Preferably the method further comprises operating the duty cycle (φs) of the secondary converter to control power flow.

Preferably the method further comprises calculating an instantaneous load power, determining a reference current for supply by the first full bridge converter, and controlling switches of the first full bridge converter to provide compensation.

In another aspect the disclosure provides a method of operating an electric vehicle charging apparatus comprising a first full bridge converter connected to the grid and configured to convert a grid supply to a DC link and a second full bridge converter connected to the DC link and configured to provide an output alternating current for use in vehicle charging, the method comprising:
  detecting a power requirement of the load or grid and operating the first and second full bridge converters to supply power from the vehicle to the load and/or the grid.

Preferably the method includes adjusting, controlling or adapting the DC link voltage to charge the vehicle.

Preferably the full bridge converter is operated at full duty cycle.

Preferably the method further comprises charging the vehicle wirelessly.

Preferably the method further comprises providing a bi-directional wireless coupling between the primary full bridge converter and the vehicle.

Preferably the method further comprises supplying the output of the primary full bridge converter to a coil for coupling to a further coil of the vehicle for inductive coupling to enable wireless power transfer.

Preferably the method further comprises detecting a reactive power requirement of a load connected to the grid, and; operating the first full bridge converter to compensate for the reactive power requirement.

Preferably the method further comprises detecting a power requirement of the load or grid and operating the first and primary full bridge converters to supply power from the vehicle to the load and/or the grid.

Preferably the method further comprises controlling the primary full bridge converter and a secondary full bridge converter associated with the vehicle to control bi-directional wireless power transfer between the grid, load and vehicle.

Preferably the method includes operating the primary and secondary converters at a relative phase angle (θ) to direct power flow to or form the vehicle. Preferably θ is +90 degrees or −90 degrees.

Preferably the method further comprises operating the duty cycle (φp) of the of the primary converter at 180 degrees.

Preferably the method further comprises operating the duty cycle (φs) of the secondary converter to control power flow.

Preferably the method further comprises calculating an instantaneous load power, determining a reference current for supply by the first full bridge converter, and controlling switches of the first full bridge converter to provide compensation.

In another aspect the disclosure provides a vehicle-grid-home interface comprising a controller configured or operable to perform any one or more of the methods above.

In another aspect there is provided a method of operating a wireless power transfer apparatus primary of which consists of a primary coil, a resonant compensation network and a full bridge converter. The primary coil is magnetically coupled to a secondary coil which is connected to a compensation network, a full bridge converter and a DC supply/load to transfer or receive wireless power, the method comprising:
  selecting a full duty cycle of the primary side full bridge converter;
  determining a required DC voltage for the DC supply/load dependent on the full duty cycle;
  controlling the DC supply/load to provide the required DC voltage.

Preferably the DC supply/load is coupled to an AC supply using an AC to DC converter.

In another aspect there is provided a PQCC comprising
  a full bridge converter
  an input coupled to a utility power supply
  an output coupled to a wireless power transfer system
  a controller configured to determine the required DC voltage for the output, and operate the full bridge converter accordingly.

In another aspect there is provided a wireless power transfer apparatus having
  a resonant compensation network;
  a full bridge converter operable to connect a DC supply/load to the compensation network to transfer or receive wireless power, and;

a controller configured to:
  select a full duty cycle for the full bridge converter;
  determine a required DC voltage for the DC supply/load dependent on the full duty cycle, and;
  control the DC supply/load to provide the required DC voltage.

In another aspect there is provided a wireless power transfer apparatus having
  a resonant compensation network;
  a full bridge converter operable to connect a DC supply/load to the compensation network to transfer or receive wireless power, and;
  a controller configured to:
    monitor a load supplied by the DC supply/load and operate the converter to draw current from, or supply current to, the DC supply/load to compensate for changes caused by the load.

In another aspect there is provided a wireless power transfer apparatus having
  a PQCC provided between the wireless power transfer apparatus and a grid connection, and;
  a controller configured to:
    monitor a load supplied by the grid and operate the PQCC to draw current from, or supply current to, the grid connection to compensate for changes caused by the load.

Other aspects will become apparent from the following description.

DRAWING DESCRIPTION

Figure 1:
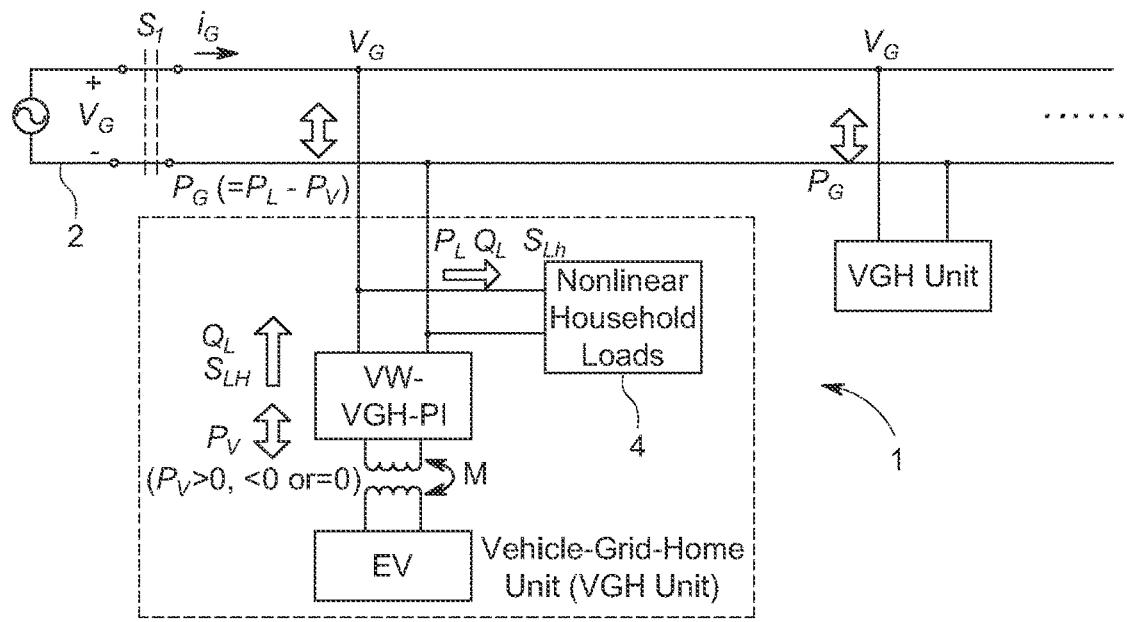
FIG. 1 is a vehicle-grid-home VGH unit-based system

FIGS. 3A, 3B, 3C, 3D, and 3E show operating modes for the system of FIG. 1

Figure 4:
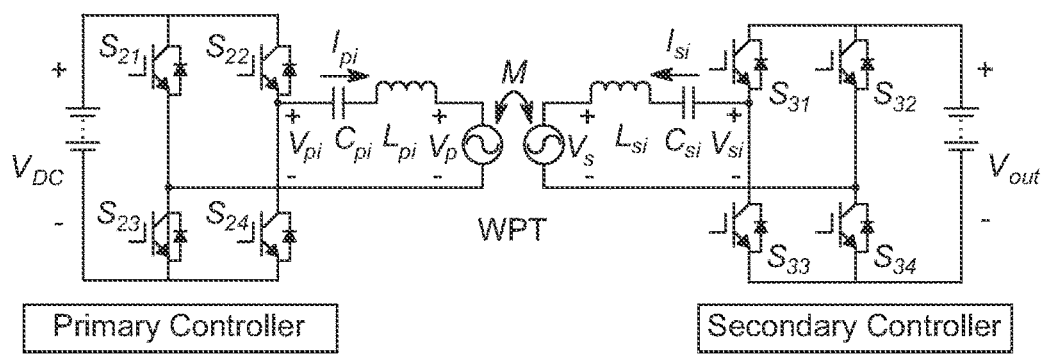

FIG. 4 is a simplified circuit schematic for a BD-WPT system

Figure 5:
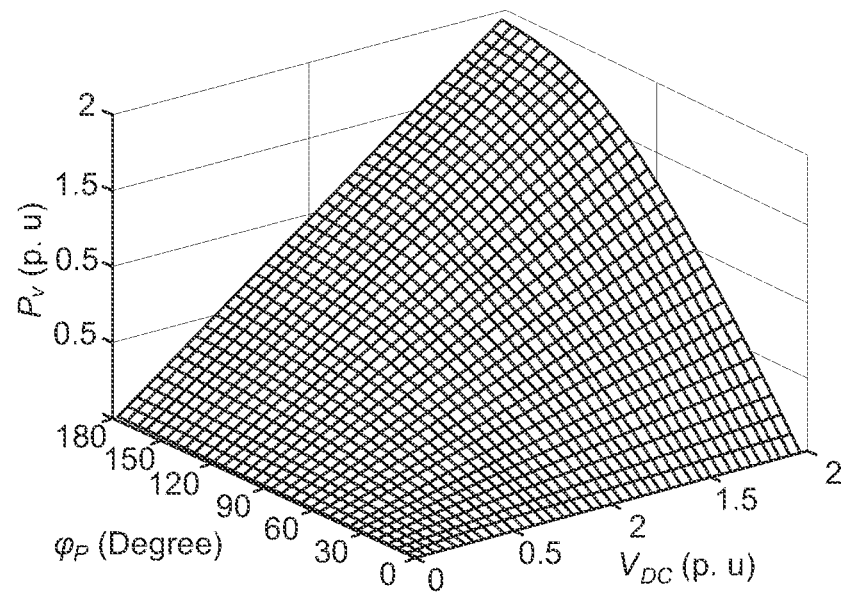
Figure 6A:
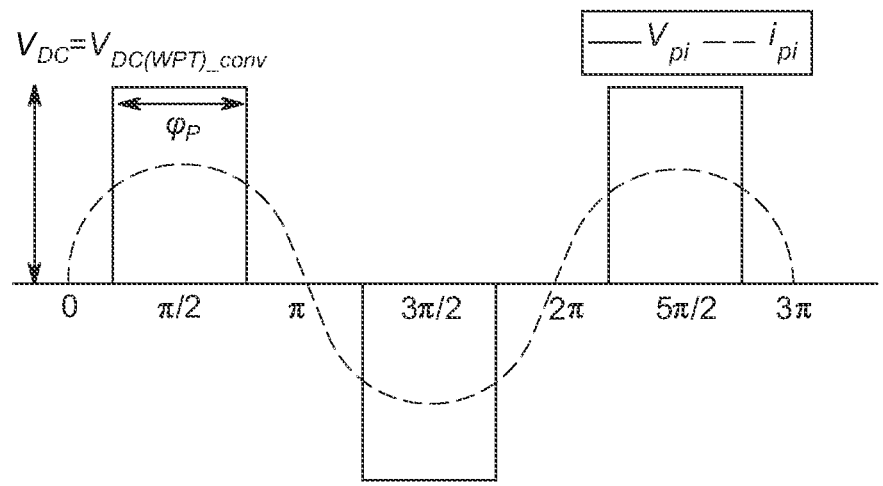
Figure 6B:
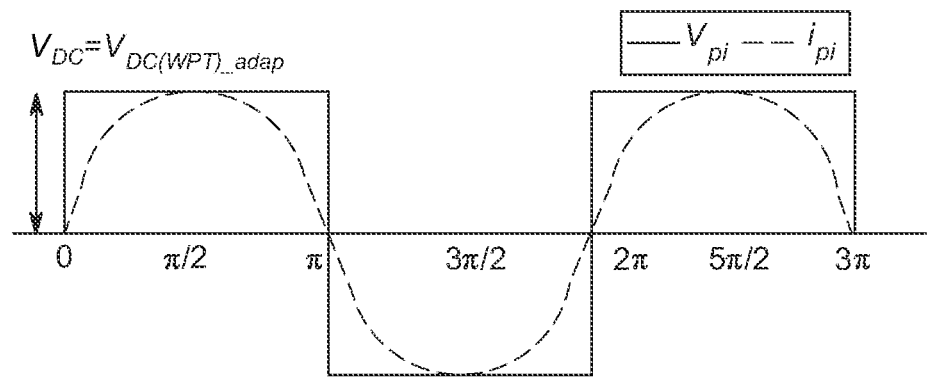
Figure 7:
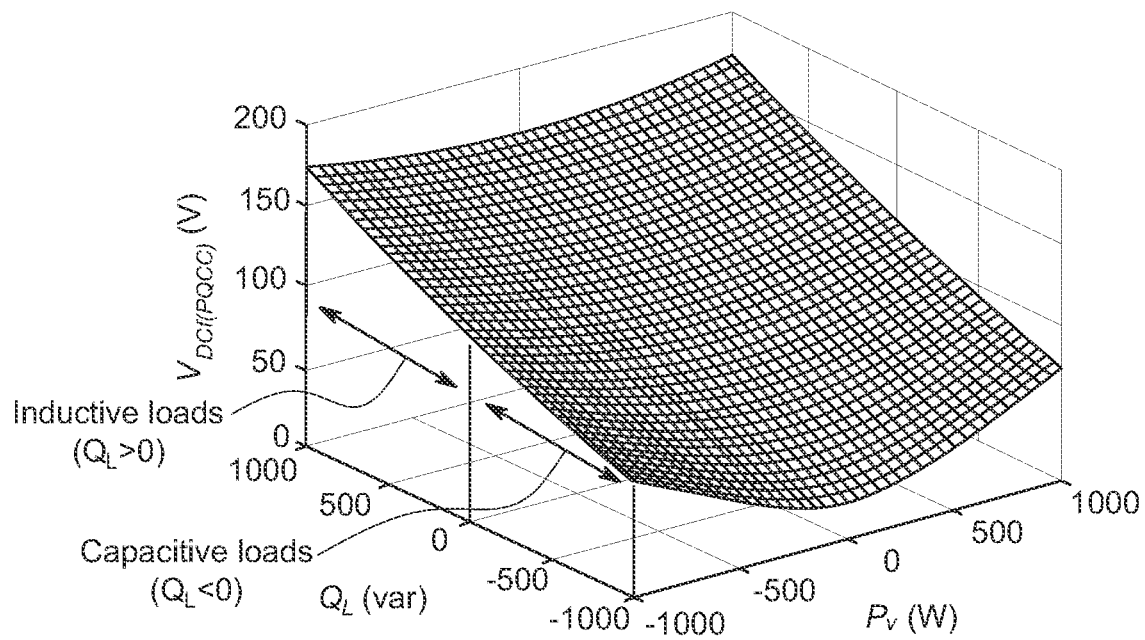
Figure 8:
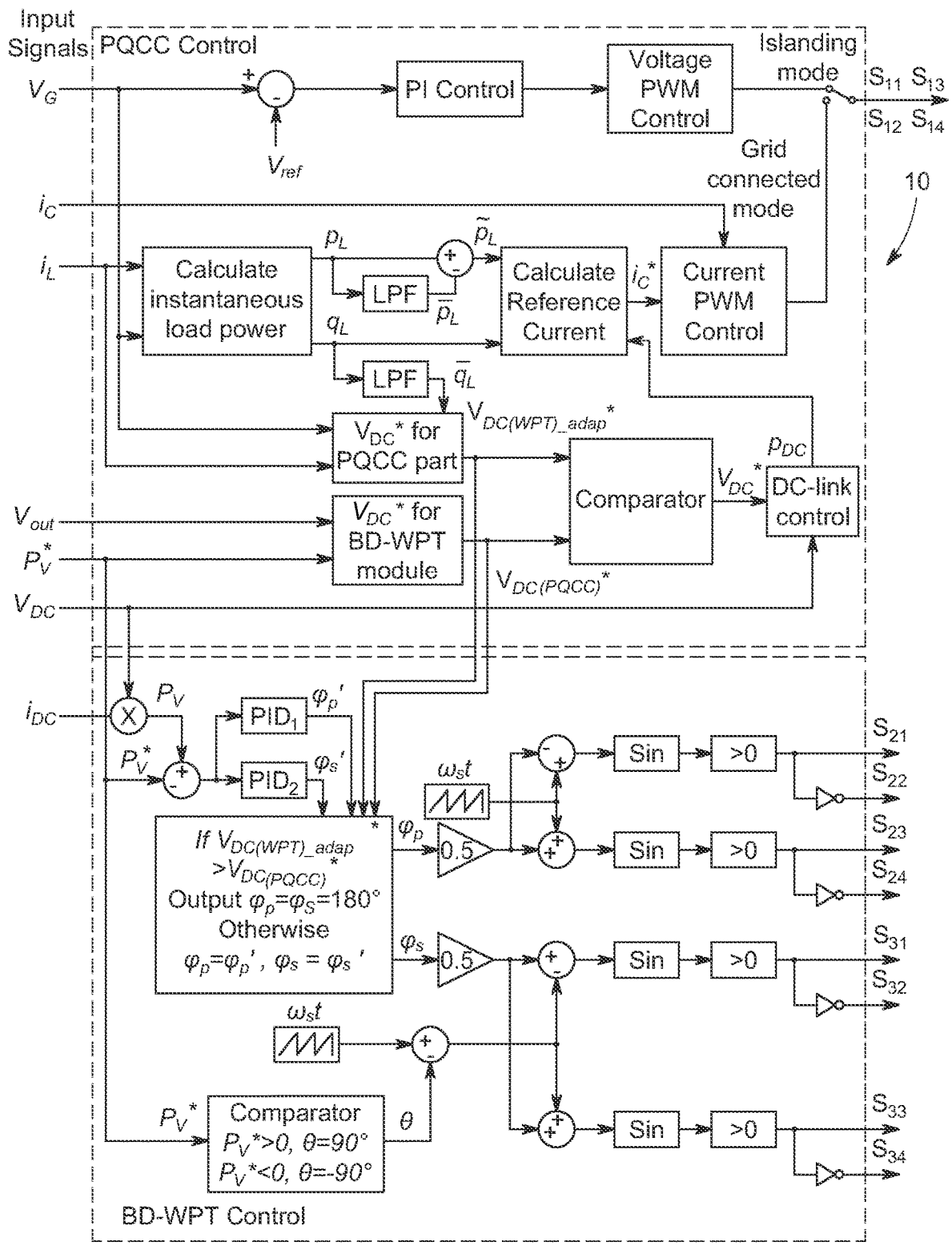
Figure 9A:
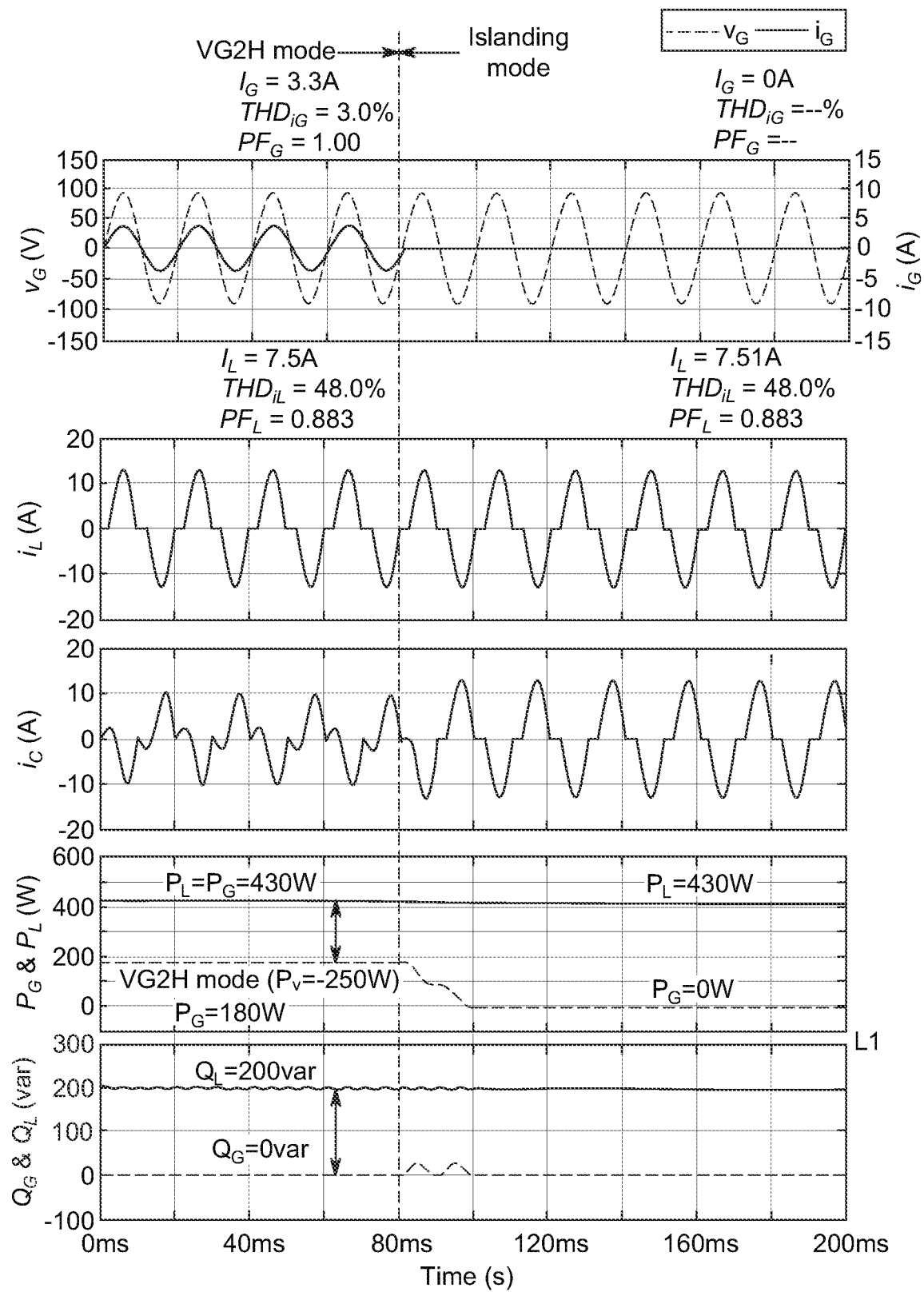
Figure 9B:
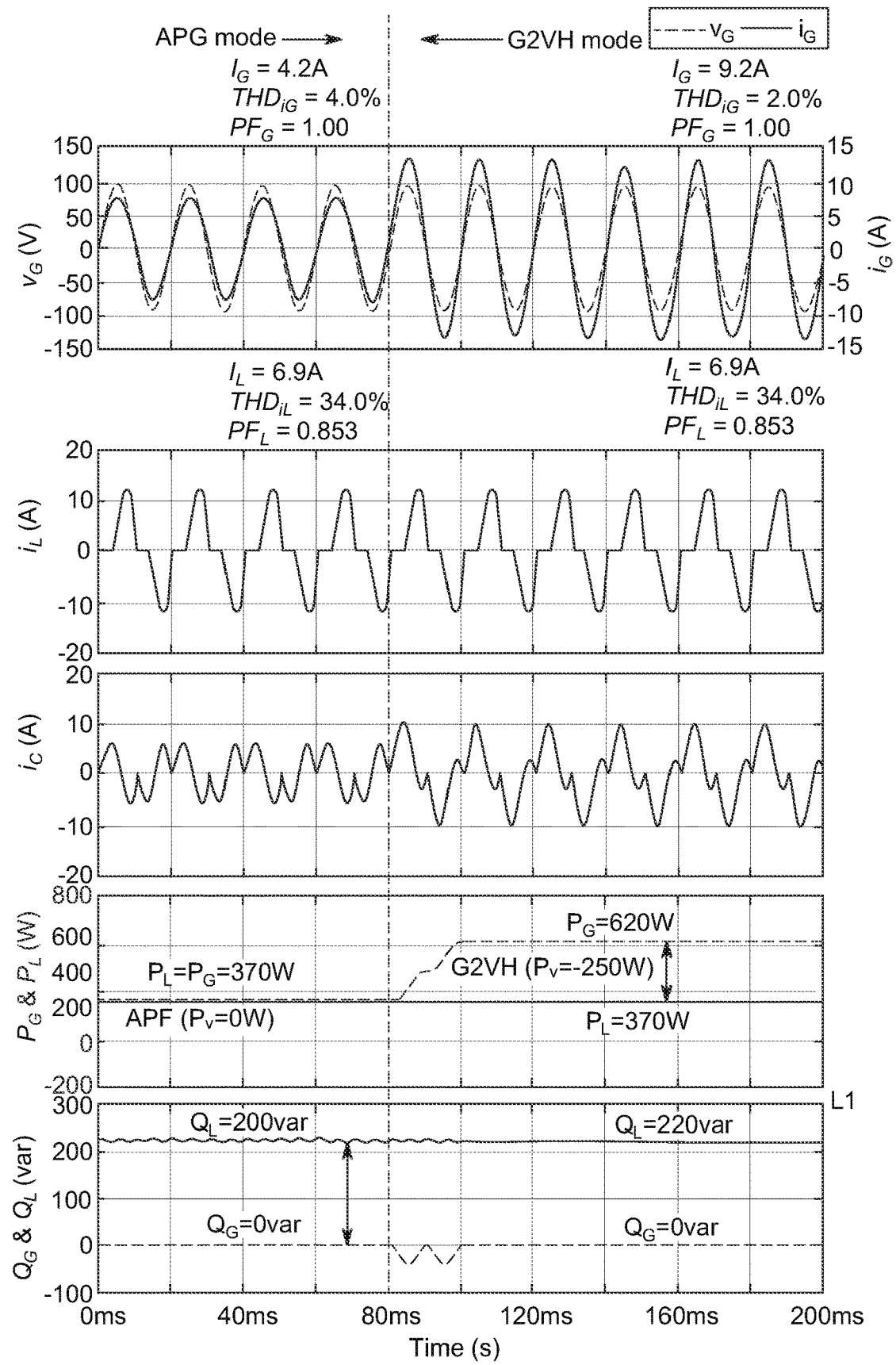
Figure 9C:
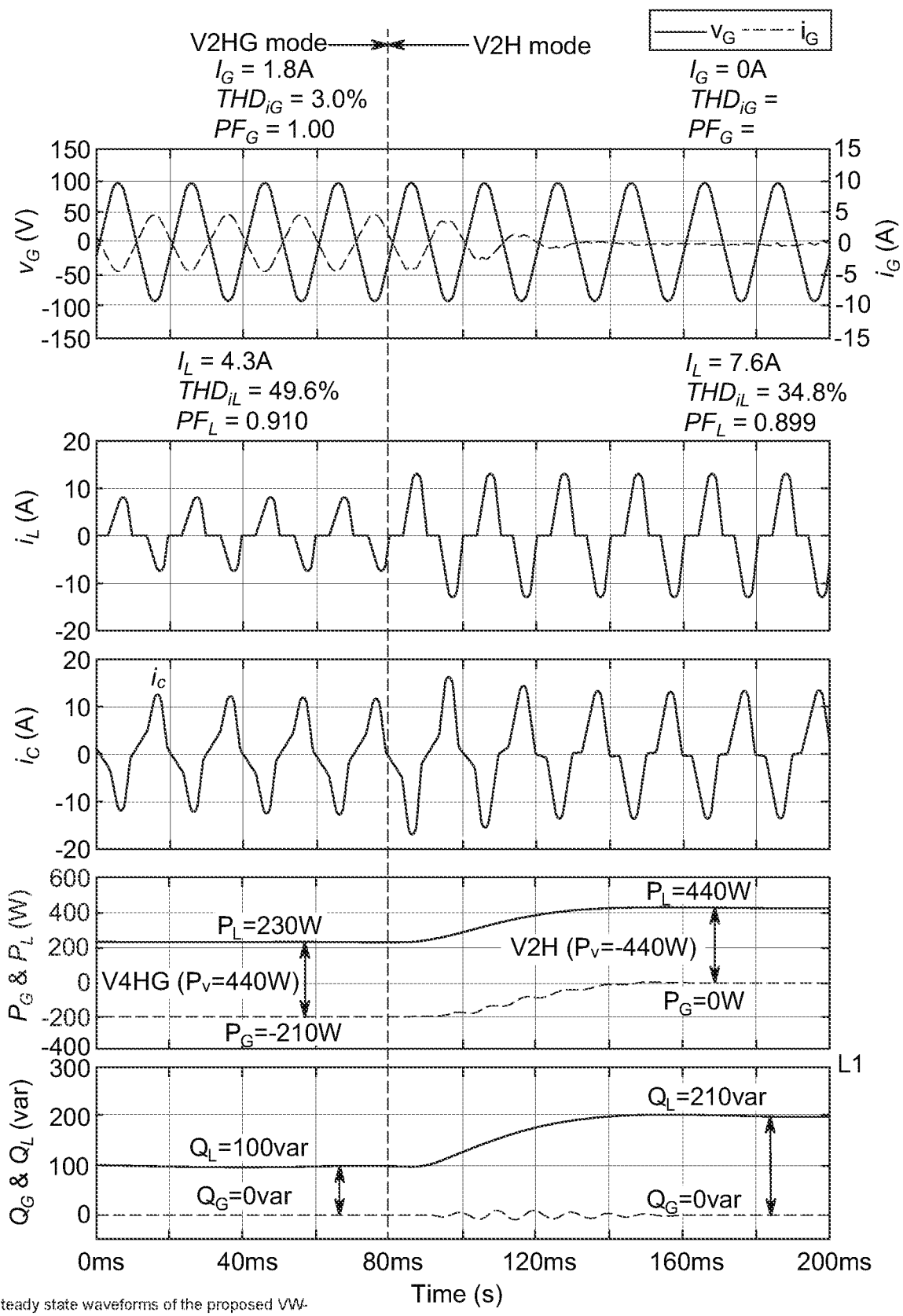
Figure 10A:
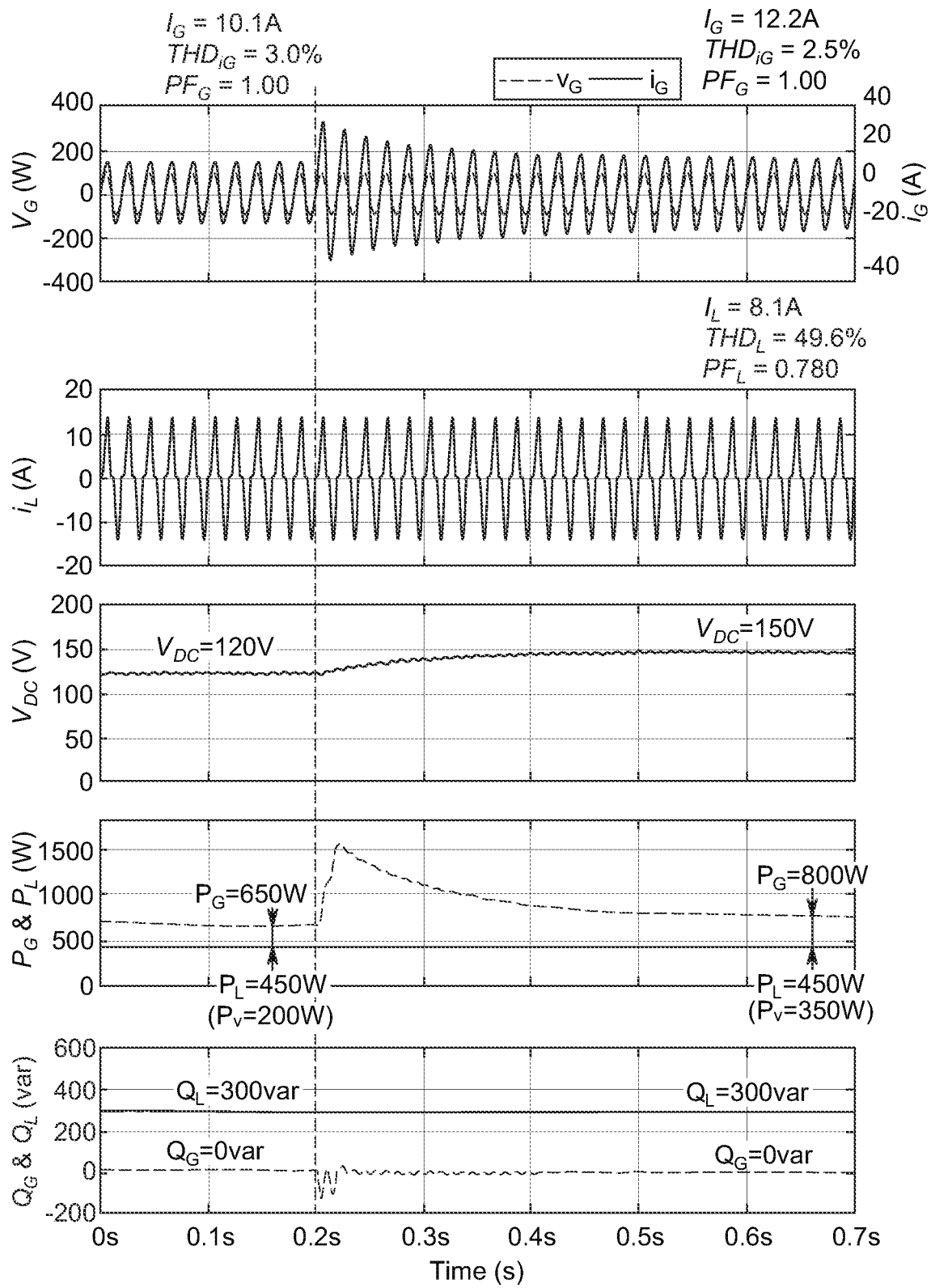
Figure 10B:
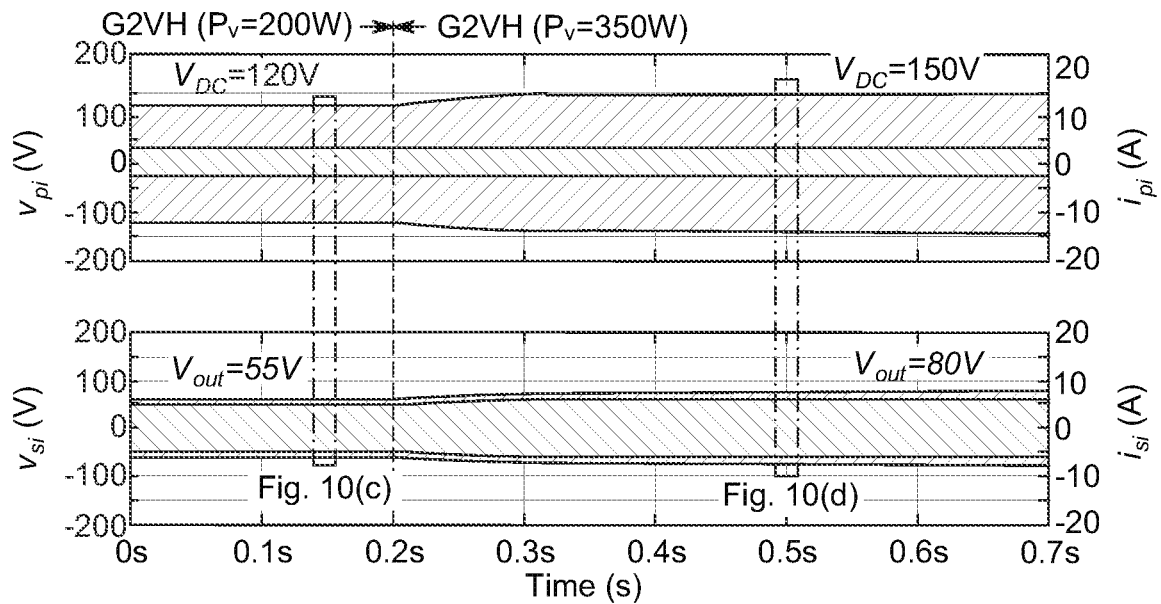
Figure 10C:
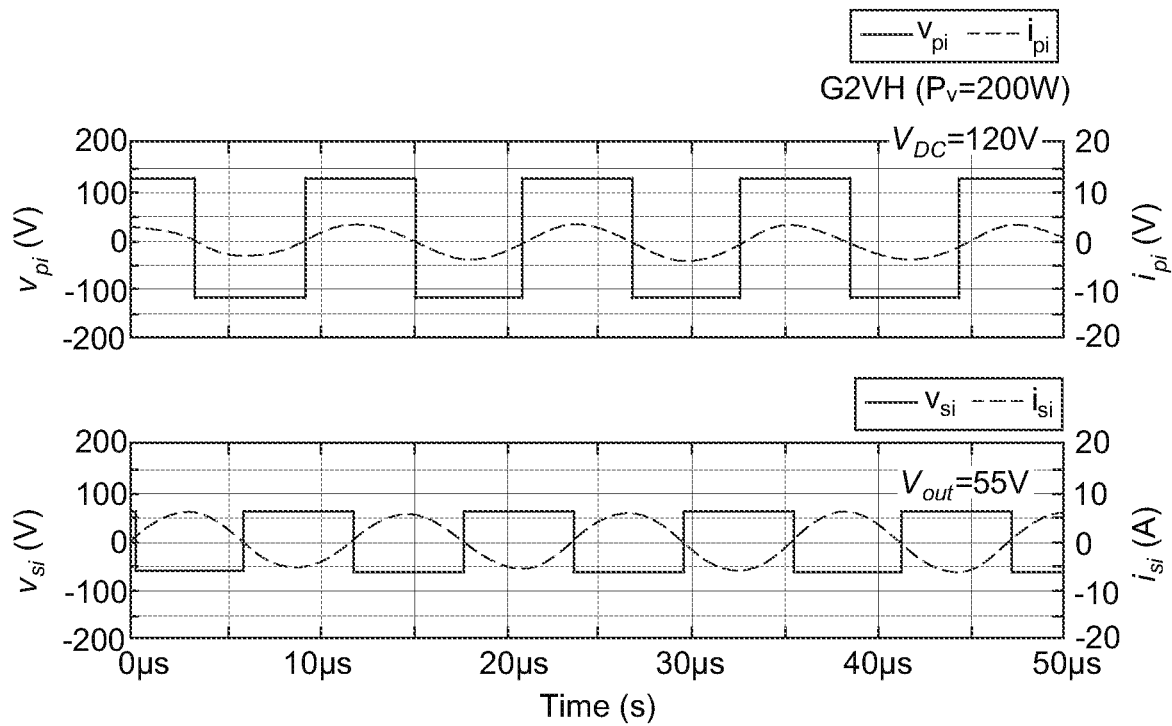
Figure 10D:
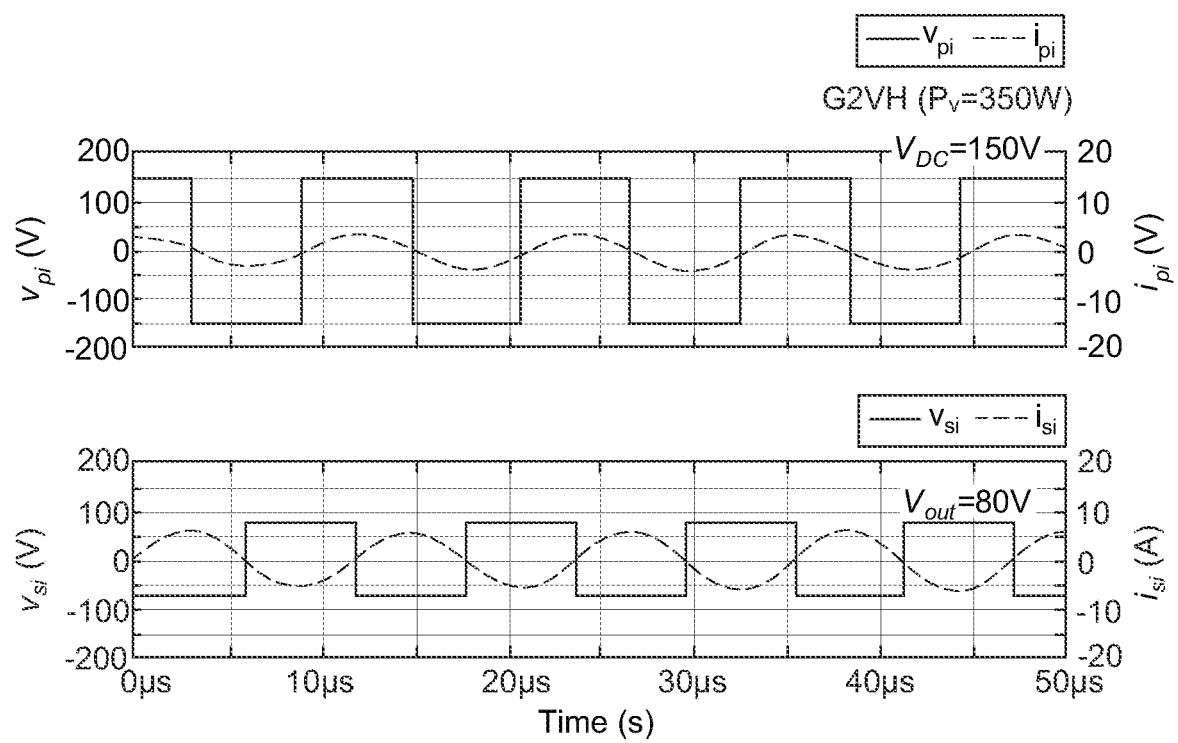
Figure 11A:
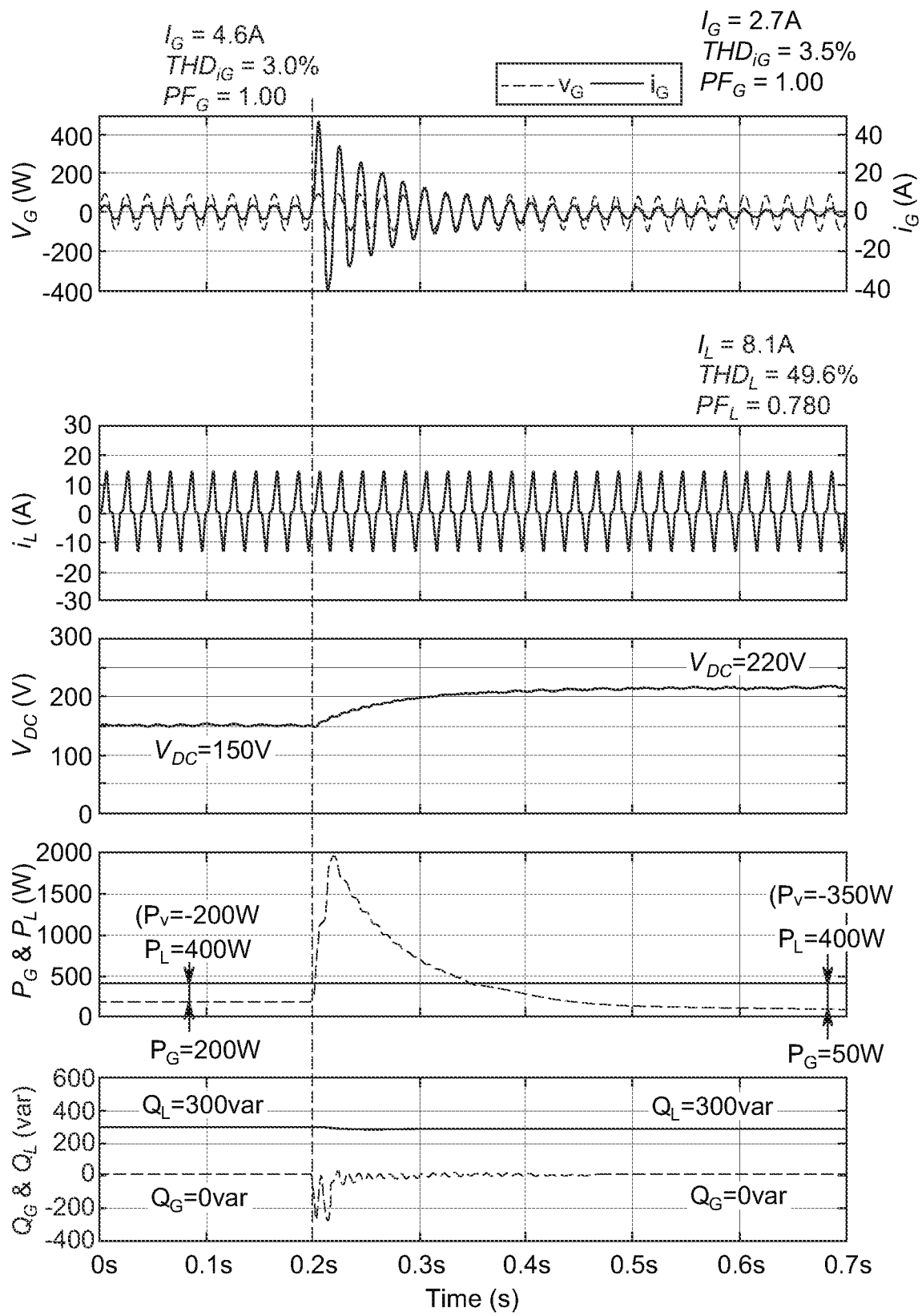
Figure 11B:
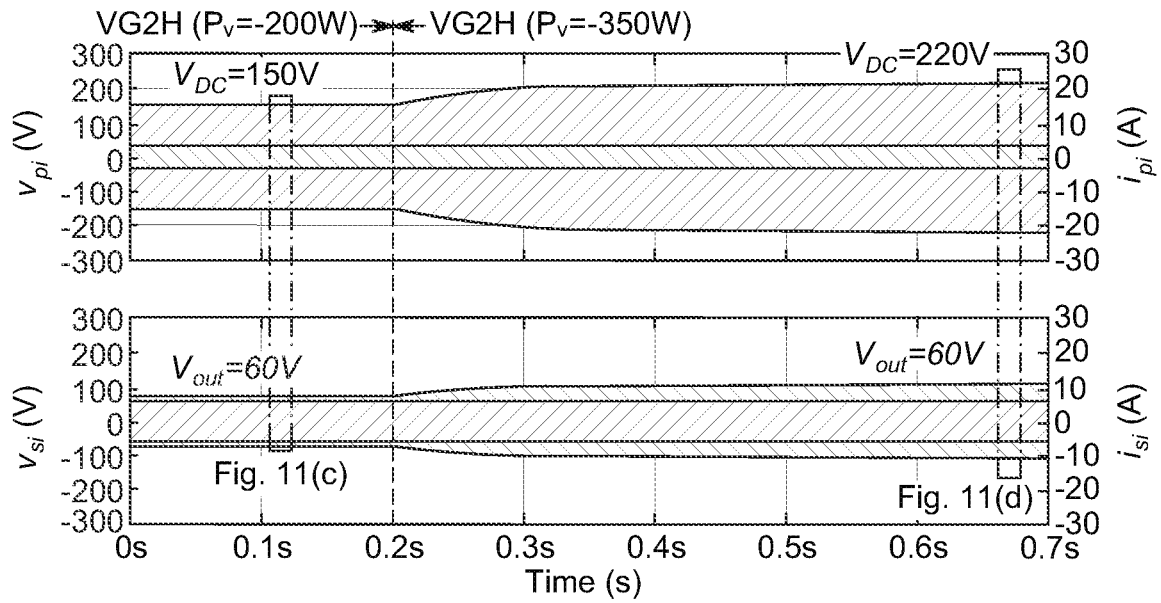
Figure 11C:
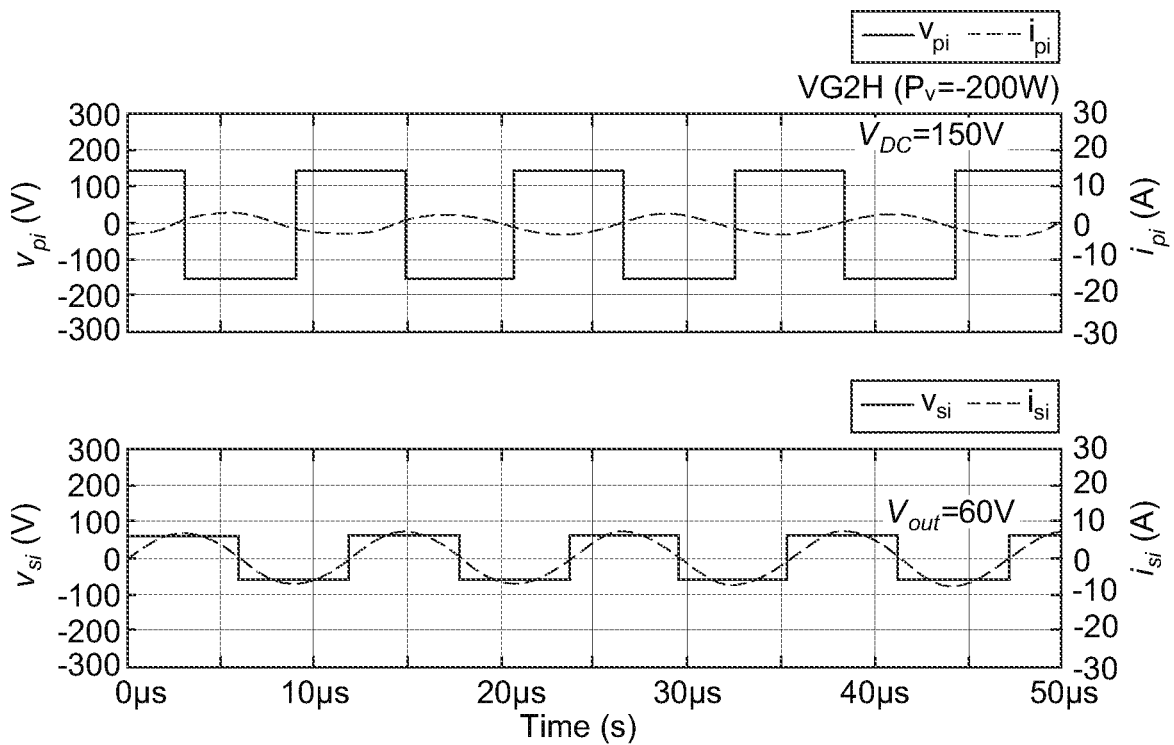
Figure 11D:
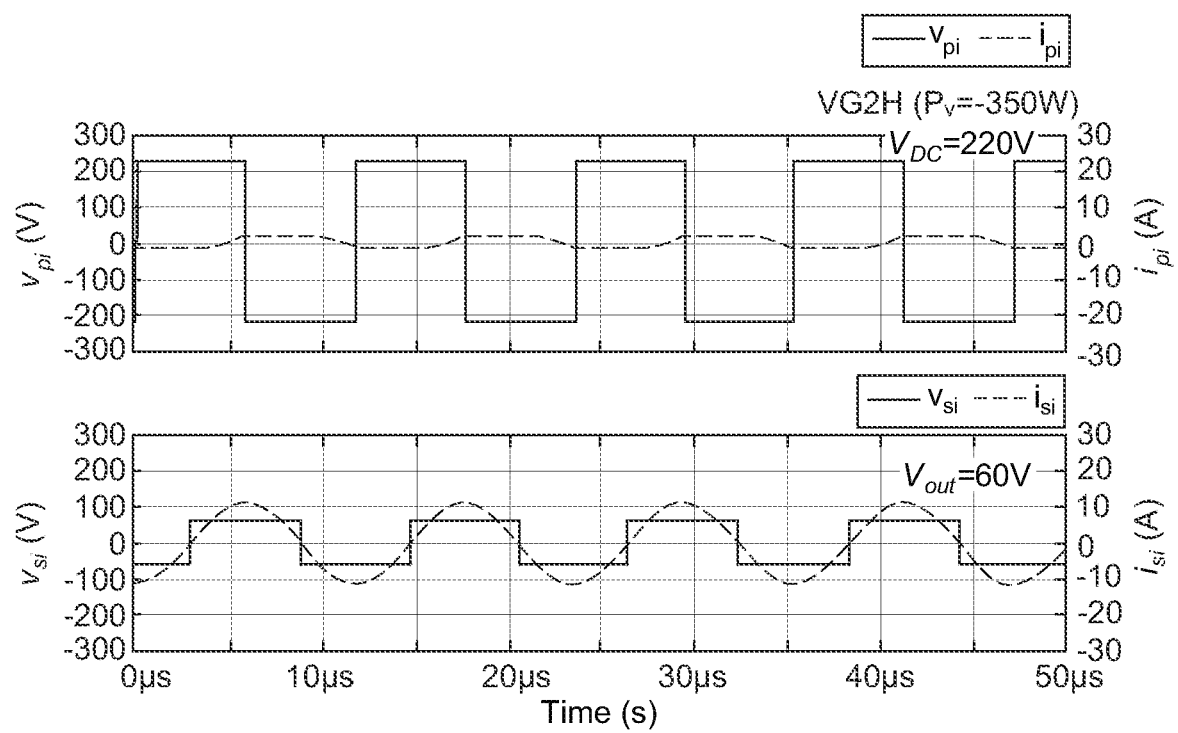

FIG. 5 is a plot of power, input voltage and the primary converter control parameter FIG. 6A shows a waveform for a conventional WPT control method with high DC voltage FIG. 6B shows a waveform for the adaptive DC control method with low DC voltage disclosed herein FIG. 7 is a plot of $V_{DC(PQCC)}$ in terms of $P_V$ and $Q_L$ FIG. 8 is a diagram of a controller FIG. 9A shows steady state waveforms of the proposed system from VG2H to islanding mode FIG. 9B shows steady state waveforms of the proposed system from VG2H to G2HV FIG. 9C shows steady state waveforms of the proposed system from V2HG to V2H FIG. 10A shows dynamic waveforms of a proposed VW-VGH-PI system under G2VH mode, including dynamic waveforms of $v_G$, $i_G$, $i_L$ and $i_{si}$ FIG. 10B shows dynamic waveforms of a proposed VW-VGH-PI system under G2VH mode, including dynamic waveforms of $v_{si}$, $i_{si}$, $v_{pi}$ and $i_{pi}$ FIG. 10C shows steady-state waveforms of a proposed VW-VGH-PI system under G2VH mode, including steady-state waveforms for $P_V$=200 W FIG. 10D shows steady-state waveforms of a proposed VW-VGH-PI system under G2VH mode, including steady-state waveforms for $P_V$=350 W FIG. 11A shows dynamic waveforms of a proposed VW-VGH-PI system under VG2H mode, including dynamic waveforms of $v_G$, $i_G$, $i_L$ and $i_{si}$ FIG. 11B shows dynamic waveforms of a proposed VW-VGH-PI system under VG2H mode, including dynamic waveforms of $v_{si}$, $i_{si}$, $v_{pi}$ and $i_{pi}$ FIG. 11C shows steady-state waveforms of a proposed VW-VGH-PI system under VG2H mode, including steady-state waveforms for $P_V$=−200 W FIG. 11D shows steady-state waveforms of a proposed VW-VGH-PI system under VG2H mode, including steady-state waveforms for $P_V$=−350 W

DETAILED DESCRIPTION

Figure 2:
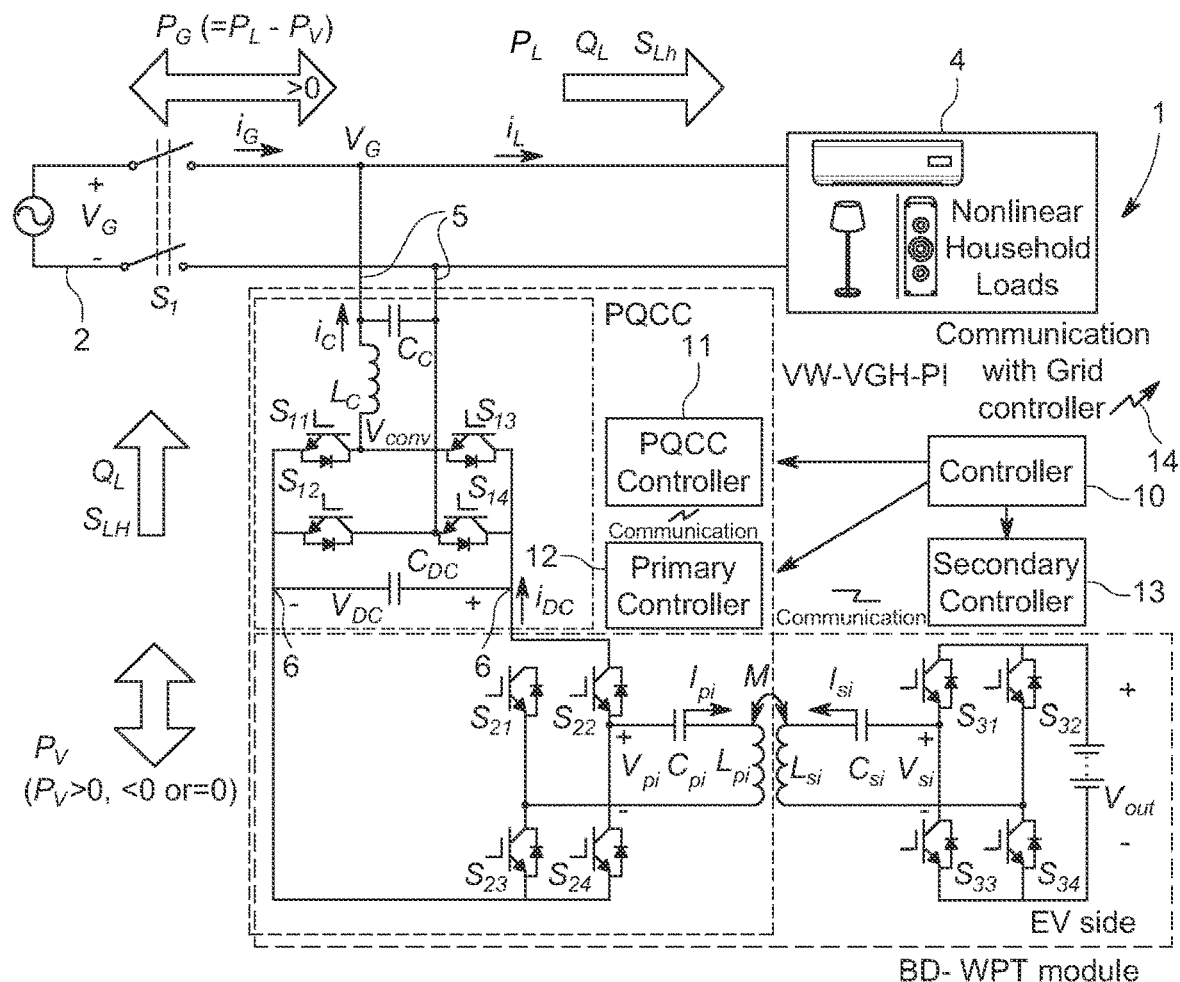
FIG. 2 is a circuit topology for a VW-VGH-PI system
Figure 3A:
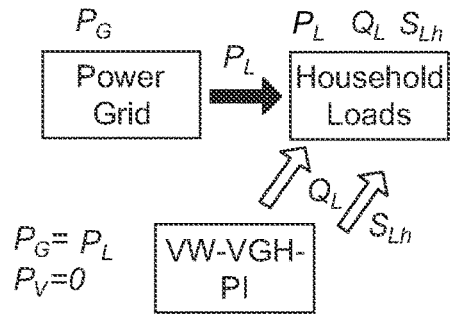
Figure 3B:
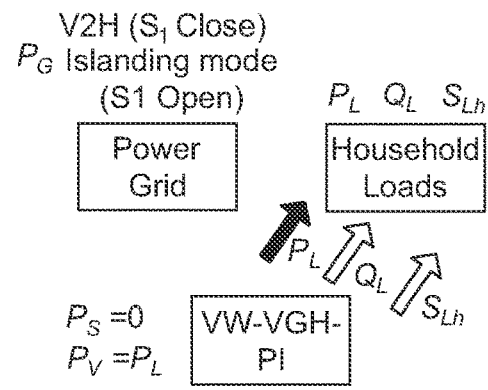
Figure 3C:
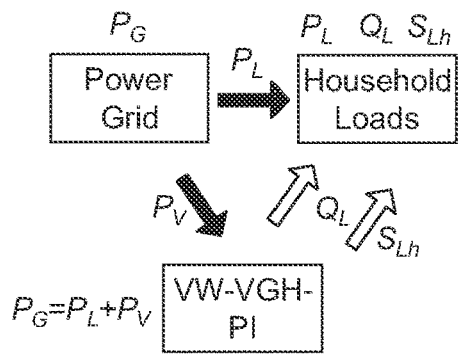
Figure 3D:
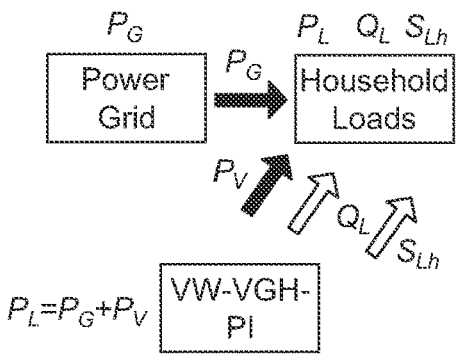
Figure 3E:
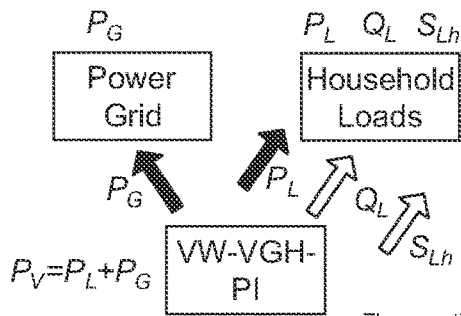

FIGS. 1 and 2 show a system topology, generally referenced 1, for a vehicle-home-grid system, which will be referred to generally herein as a Versatile Wireless Vehicle-Grid-Home Power Interface (VW-VGH-PI) system. The utility supply (or grid, or mains) 2 supplies power at a mains frequency (for example 50 or 60 Hz) at voltage $v_G$ and current $i_G$. Loads 4, which in the example illustrated comprises home or household or local loads are electrically connected to the grid, drawings current $i_L$ at voltage $v_G$. The loads 4 may be, and are typically, non-linear.

A first full bridge converter, referred to herein as a power & quality control converter (PQCC) has an input 5 coupled to the grid 1, and an output 6 coupled to a wireless power transfer system (BD-WPT). In this example the BD-WPT is a bi-directional wireless power transfer system. In some other examples it is possible that the WPT is uni-directional. It will be understood by those skilled in the art that the WPT system could be replaced by a wired charging system in which a full bridge converter supplies current to an isolating transformer, and another converter associated with the vehicle converts the alternating current to a direct current for charging (or supplying power back to the grid/load). Also, although a series tuned compensation network is shown in FIG. 2, other networks may be used, for example parallel tuned networks.

The PQCC comprises switches $S_{11}$ $S_{12}$ $S_{13}$ and $S_{14}$ arranged in a full bridge configuration. A coupling component or network such as inductor $L_c$ is connected (in this example in series) with the grid to reduce the current ripple. A parallel capacitor $C_c$ is used in this example to maintain the output voltage under islanding mode. A DC-link capacitor $C_{DC}$ is designed to maintain the DC voltage of the DC link at the output 6 at or under a satisfactory voltage ripple. Voltage $v_{conv}$ is the voltage across the input of the bridge of the PQCC. $P_L$, $Q_L$, and $S_{Lh}$ are load active, reactive and harmonic power, respectively, and $P_V$ is the active power received from or supplied to the BD-WPT system. PQCC is controlled to produce current $i_c$ at $V_{conv}$ to supply required $P_V$, $Q_L$, and $S_{Lh}$.

In the BD-WPT module, the primary side converter derives power from the grid through PQCC and is fed by the output DC voltage $V_{DC}$ while the secondary side converter is considered to be connected to a load such as a battery. This is represented in the FIG. 2 as an EV and represented by an individual DC source $V_{out}$ to either store or retrieve energy. The primary and secondary side coils, represented by self-inductances $L_{pi}$ and $L_{si}$, are separated by an air-gap, but magnetically coupled through mutual inductance M. The primary and secondary side series connected capacitors $C_{pi}$ and $C_{si}$ are designed to minimize the reactive power requirement in the BD-WPT.

PQCC is used to support the reactive and harmonic power ($Q_L$ and $S_{Lh}$) compensation of the nonlinear household loads while meeting the active power supply/demand in accordance with $P_G=(P_V-P_L)$. The BD-WPT module is used to transfer (preferably bi-directionally) the active power $P_V$ under Islanding mode, V2H mode, G2VH mode, VG2H and V2HG and any other possible modes as required. These operation modes are illustrated in FIGS. 3A-3E. In all modes, both the reactive and harmonic power of the household loads are to be, or can be, supplied by the PQCC, subject to its capacity. The EV acts as an active load to absorb active power ($P_V>0$) from the power gird in the G2VH mode. In contrast, the EV is represented as a DC supply to deliver power ($P_V<0$) to household loads in the VG2H mode. Also, the EV power can flow into another EV through VW-VGH-PIs. Those skilled in the art will understand that the monitored or sampled parameters, such as those shown and described in this document, but in particular those identified in the control system shown in FIG. 8 below, may be used to determine an appropriate operating mode (as per FIGS. 3A-3E) for the system, and control the system to operate in that mode, as described further below.

As shown in FIG. 4, the BD-WPT module employs a full-bridge converter on the primary side to generate high-frequency current in the primary coil/track from the DC link voltage $V_{DC}$. The full-bridge converter employed on the secondary side can be connected to active loads such as EVs, to enable supply or retrieval of energy.

Based on FIG. 4, the input and output currents can be expressed as:

$$I_{pi} = \frac{V_{pi} - V_p}{j\omega_s L_{pi} - 1/j\omega_s C_{pi}} = \frac{V_{pi} - j\omega_s M I_{si}}{j\omega_s L_{pi} - 1/j\omega_s C_{pi}} \quad (1)$$

$$I_{si} = \frac{V_{si} - V_s}{j\omega_s L_{si} - 1/j\omega_s C_{si}} = \frac{V_{si} - j\omega_s M I_{pi}}{j\omega_s L_{si} - 1/j\omega_s C_{si}} \quad (2)$$

where $V_p$ and $V_s$ are voltages induced in the primary and secondary coils, respectively, and M is the mutual inductance. The voltages $V_{pi}$ and $V_{si}$ produced by the converters from $V_{DC}$ and $V_{out}$, respectively, can be expressed as:

$$v_{pi}(t) = \frac{4}{\pi} V_{DC} \sum_{n=1,3,\ldots}^{\infty} \frac{1}{n}\cos(n\omega_s t)\sin\left(\frac{n\varphi_p}{2}\right) \quad (3)$$

$$v_{si} = \frac{4}{\pi} V_{out} \sum_{n=1,3,\ldots}^{\infty} \frac{1}{n}\cos(n\omega_s t + n\theta)\sin\left(\frac{n\varphi_s}{2}\right) \quad (4)$$

where n is the harmonic number, $\varphi_p$ is the primary side phase shift modulation, $\varphi_s$ is the secondary side phase shift modulation and $\theta$ is the relative phase angle between the two voltages produced by converters, and $\omega_s$ is the angular switching frequency of both the primary and secondary converters which is equal to the angular resonant frequency $\omega_r$, which can be expressed as:

$$\omega_r = \omega_s = \frac{1}{\sqrt{L_{pi} \cdot C_{pi}}} = \frac{1}{\sqrt{L_{si} \cdot C_{si}}} \quad (5)$$

The power flow on the EV side can be expressed by:

$$P_V(\varphi_p, \varphi_s, \theta) = P_{p\_1}(\varphi_p, \varphi_s, \theta) = \quad (6)$$
$$\frac{1}{2}\text{Re}(V_{pi\_1} I^*_{pi\_1}) = -\frac{8}{\pi^2}\frac{1}{\omega_s M} V_{DC} V_{out} \sin\left(\frac{\varphi_p}{2}\right)\sin\left(\frac{\varphi_s}{2}\right)\sin(\theta)$$

$$Q_V(\varphi_p, \varphi_s, \theta) = Q_{p\_1}(\varphi_p, \varphi_s, \theta) = \quad (7)$$
$$\frac{1}{2}\text{Im}(V_{pi\_1} I^*_{pi\_1}) = \frac{8}{\pi^2}\frac{1}{\omega_s M} V_{DC} V_{out} \sin\left(\frac{\varphi_p}{2}\right)\sin\left(\frac{\varphi_s}{2}\right)\cos(\theta)$$

The purpose of the BD-WPT controller is to control $P_V$ at its reference value, while minimizing its reactive power requirement. In (6) and (7), the reactive power components on both sides of the system can be minimized ($Q_V=0$) by keeping the relative phase angle $\theta$ between the voltages of primary and the secondary-side converters to be either $+90°$ or $-90°$. The direction of power flow can be controlled through the sign of the relative phase angle. Apart from $\theta$, both $\varphi_p$ and $\varphi_s$ as well as $\omega_s$ can be used to control the active power transfer. In this example, $\varphi_p$ is set as the first priority for active power control, while $\varphi_s$ is set to $180°$. Based on (6), the relationship among the $P_V$, $V_{DC}$ and $\varphi_p$ can be shown as in FIG. 5.

As evident from FIG. 5, $P_V$ can be regulated through controlling phase shift $\varphi_p$ or input voltage $V_{DC}$. Conventionally, $P_V$ is regulated by controlling $\varphi_p$ while $V_{DC}$ is set to a fixed value. However, the proposed PQCC employs an adaptive DC-link voltage control method to regulate $P_V$ by varying $V_{DC}$, as appropriate, and thereby lowers switching losses and harmonic distortion in PQCC as well as in the primary converter of the BD-WPT module. The comparison between a conventional control method using $\varphi_p$ and the proposed control method is made with reference to FIGS. 6A and 6B.

Conventionally, as in FIG. 6A, $V_{DC}$ is designed to be a fixed value $V_{DC(WPT)\_conv}$, and $P_V$ is regulated by indirectly controlling $V_{DC(WPT)\_conv}$ through $\varphi_p$ (effectively the duty cycle) of the primary side converter of the WPT module.

In contrast, as shown in FIG. 6B, the proposed adaptive method regulates $P_V$ by directly controlling $V_{DC}=V_{DC(WPT)\_adap}$ through PQCC while keeping $\varphi_p$ of the primary side converter of the WPT module at $180°$, which corresponds to maximum duty cycle of 100%. The $V_{DC(WPT)\_adap}$ is designed for the condition that corresponds to either supply or absorption of maximum $P_V$.

The switching loss of any semiconductor device in PQCC can be approximated as:

$$P_{sw}(V_{DC}) = V_{DC} I_c f_{sw}\left[\frac{1}{8}t_{rN}\frac{I_c}{I_{CN}} + t_{fN}\left(\frac{1}{3\pi} + \frac{1}{24}\frac{I_c}{I_{CN}}\right)\right] \quad (8)$$

where $V_{DC}$, $I_C$, $I_{CN}$, $t_{rN}$, $t_{fN}$, and $f_{sw}$ are the DC-link voltage, PQCC output current, rated current, rated rise time, rated fall time, and switching frequency, respectively. As evident from (8), $V_{DC}$ is proportional to the switching loss, for any given $I_C$ which is injected in to the grid based on active, reactive and harmonic power requirements. Thus by lowering $V_{DC}$ as appropriate using the adaptive control concept, the switching loss of PQCC can be reduced.

Under the conditions specified for PQCC in (8), the same power $P_V(V_{DC}, \varphi_p)$ in (6) must be transferred through the primary side converter of the BD-WPT module. Then considering the same power transfer through both the conventional constant DC link voltage method and the new adaptive DC-link control, the following expression can be obtained:

$$P_V(V_{DC} = V_{DC(WPT)\_conv}, \varphi_p) = P_V(V_{DC(WPT)\_adap}, \varphi_p = 180°) \quad (9)$$

$$V_{DC(WPT)\_conv} \sin\left(\frac{\varphi_p}{2}\right) = V_{DC(WPT)\_adap} \quad (10)$$

Accordingly, based on (6) and (8), the switching loss ratio between the conventional method and proposed method of the primary side BD-WPT converter can be given as (11).

$$\frac{P_{sw\_conv}}{P_{sw}} = \frac{1}{\sin\left(\frac{\varphi_p}{2}\right)} \quad (11)$$

A smaller $\varphi_p$ in (11) indicates that the conventional method uses high DC link voltage to transfer low $P_V$, incurring high switching losses but with adaptive control the switching loss would be only a fraction of the conventional switching loss. Moreover, the primary side BD-WPT converter is always operated with full duty cycle and enables operation with approximate soft-switching. Consequently the switching losses are further reduced and in addition to lowering the harmonic distortion.

According to (6) and under the conditions of $\varphi_p=\varphi_s=180°$ and $\theta=+90°$ or $-90°$, the maximum DC-link voltage that is required for the BD-WPT module is calculated as:

$$V_{DC(WPT)\_adap} = \left|\frac{\pi^2 \omega_s M P_V}{8 V_{out}}\right| \quad (12)$$

The the DC-link voltage given in (12) is adaptively controlled by PQCC in accordance with the reference $P_V$. However in addition to the maximum $V_{DC}$ voltage specified in (12) that satisfies the BD-WPT module requirement, there is also a minimum $V_{DC}$ voltage, represented by $V_{DC(PQCC)}$, at which PQCC is always guaranteed to supply the AC grid with the required $P_V$, $Q_L$ and $S_{Lh}$. Based on FIG. 2, the fundamental component of the voltage produced by PQCC can be expressed as:

$$\vec{V}_{convf} = \quad (13)$$
$$\vec{V}_G + X_{Lc} \cdot \vec{I}_{cf} = V_G + j\omega L_c \cdot \left(\frac{P_V - jQ_L}{V_G}\right) = j\frac{\omega L_c P_V}{V_G} + \left(V_G + \frac{\omega L_c Q_L}{V_G}\right)$$

From (13), the minimum required fundamental DC-link voltage can be obtained as:

$$V_{DCf(PQCC)} = \sqrt{2} V_{conv} = \sqrt{2} \sqrt{\left(\frac{\omega L_c P_V}{V_G}\right)^2 + \left(V_L + \frac{\omega L_c Q_L}{V_G}\right)^2} \quad (14)$$

From (14) and parameters in Table I, the requirement of $V_{DC(PQCC)}$ can be determined, and as evident from FIG. 7, the minimum fundamental DC-link voltage $V_{DC(PQCC)}$ depends on the active and reactive power supplied by the PQCC.

To satisfy harmonic power requirement $S_{Lh}$, the harmonic component of DC link voltage should be:

$$V_{DCh(PQCC)} = \sqrt{2} V_{convh} \approx \sqrt{2} \sqrt{\sum_{n=1}^{n=N}(n\omega L_c \cdot I_{Ln})^2} \quad (15)$$

where n is the harmonic order, N is the maximum harmonic selected depending on the application, $n\omega L_c$ is the harmonic impedance, $I_{Ln}$ is the harmonic load current. Hence, the total required DC link voltage of PQCC can be expressed as:

$$V_{DC(PQCC)} = \sqrt{V_{DCf(PQCC)}^2 + V_{DCh(PQCC)}^2} \quad (16)$$

The final DC-link voltage can be determined by selecting the maximum of the two values of $V_{DC(WPT)\_adap}$ and $V_{DC(PQCC)}$.

The system shown in FIG. 1 is controlled using a controller or control module 10 configured as shown in FIG. 8. The controller can be provided in two parts, a first part 52 which is a controller for the PQCC, and a second part 54 which is a controller for the WPT module. In an embodiment the PQCC may be provided as a separate unit with a controller 11 to enable it to be connected to an existing WPT module which may have a separate controller or controllers 12 and 13. It will also be seen that the PQCC may be provided in combination with WPT apparatus i.e. the WPT apparatus may include the PQCC. The controller may be provided as one or more processors programmed to perform the control functions shown in FIG. 8 and as disclosed herein. Communication is provided if necessary between the control modules 10, 11, 12, 13. Also, communication means 14 can be provided to allow the system 1 to communicate with a grid or similar controller which may be operated by a utility supply entity. Thus, if demand on the grid needs to be reduced, this may be communicated to the controller 10, so that vehicle charging for example, can be reduced, or additional compensation may be provided.

A control strategy and system for the adaptive DC-link voltage control will now be provided, and disclosed with reference to the controller of FIG. 8.

In FIG. 8, the change of $P_V^*$ is mainly used to automatically determine the transitions between modes. The $P_V^*$ is from the gird controller or EV users.

In one example the single phase PQ method is used to implement the controller. This involves implementing an instantaneous active and reactive current P-Q controller for the regulation of current $i_C$. Specifically to track the reference value $i_C^*$, the PQCC controller generates the current $i_C$ by using pulse width modulation control, such as current hysteresis pulse width modulation (PWM) control. In this example the hysteresis PWM is selected due to its simplicity of implementation, fast dynamic response, and good current limiting capability. The reference $i_C^*$ can thus be calculated as:

$$i_c^* = \frac{1}{v_G^2 + (v_G^D)^2}\left[-v_G \cdot (\tilde{p}_L + P_V^* + p_{DC}) + v_G^D \cdot q_L\right] \quad (17)$$

where $v_G$ and $v_G^D$ are the grid voltage and instantaneous $\pi/2$ lag of load voltage; $P_V^*$ is the reference active power from the BD-WPT module; $p_{DC}$ is the DC controlled required active power; $p_L$ and $q_L$ are the load instantaneous active and reactive current, which contain both DC components and AC components. The AC component $\tilde{p}_L$ is obtained by passing $p_L$ through a low pass filter (LPF) and subsequent subtraction. In (17), $p_L$, $q_L$ and $p_{DC}$ can be expressed as:

$$\begin{bmatrix} p_L \\ q_L \end{bmatrix} = \left\{ \begin{bmatrix} v_G & v_G^D \\ -v_G^D & v_G \end{bmatrix} \cdot \begin{bmatrix} i_L \\ i_L^D \end{bmatrix} \right\} \quad (18)$$

$$p_{DC} = k_p \cdot (V_{DC} - V_{DC}^*) \quad (19)$$

where $i_L$ and $i_L^D$ are the load current and instantaneous $\pi/2$ lag of load current, $V_{DC}$ and $V_{DC}^*$ are the DC-link voltage and its reference value, $k_p$ is the proportional gain control. The reference $V_{DC}^*$ is obtained by selecting maximum value of $V_{DC(PQCC)}^*$ and $V_{DC(BD\text{-}WPT)}^*$ by using (16) and (12) with $P_V = P_V^*$, respectively. The instantaneous expressions of $V_{DC(PQCC)}^*$ and $V_{DC(WPT)}^*$ are obtained by substituting $P_V = P_V^*$ based on (14) and (12) and given as:

$$V_{DC(PQCC)}^* = \sqrt{2} \sqrt{\left(\frac{\sqrt{2}\omega L_c P_V^*}{\sqrt{v_G^2+(v_G^D)^2}}\right)^2 + \left(\frac{\sqrt{v_G^2+(v_G^D)^2}}{\sqrt{2}} + \frac{\sqrt{2}L_c \cdot \bar{q}_L}{2\sqrt{v_G^2+(v_G^D)^2}}\right)^2 + \sum_{n=1}^{n=N}(n\omega L_c \cdot I_{Ln})^2} \quad (20)$$

$$V_{DC(WPT)\_adap}^* = \left|\frac{\pi^2 \omega_s M P_V^*}{8 V_{out}}\right| \quad (21)$$

Finally, $V_{DC}^*$ is obtained by selecting the maximum value of $V_{DC(PQCC)}^*$ in (18) and $V_{DC}^*$ in (19) as:

$$V_{DC}^* = \text{Max}(V_{DC(PQCC)}^*, V_{DC(WPT)\_adap}^*) \quad (22)$$

According to FIG. 8, the reference DC-link voltages ($V_{DC(PQCC)}^*$ and $V_{DC(WPT)\_adap}^*$) are instantaneously calculated using (20) and (21) for PQCC and the BD-WPT module, respectively. Then the maximum of these two voltages is taken as the final value of $V_{DC}^*$ as per (22). This is followed by the use of (19) to calculate the required active power $p_{DC}$ for DC-link voltage control, and the use of (18) to calculate the load reactive power $q_L$ and active power $p_L$. The LPF and (17) are used to transform the load reactive power, harmonic power, reference active power and $p_{DC}$ to $i_c^*$. To generate $i_c$, the switching signals of the full-bridge converter of PQCC are derived using PWM control and comparing $i_c$ with $i_c^*$.

For the control of BD-WPT module, the active power $P_V$ is controlled through $\varphi_p$ and $\varphi_s$ and $\theta$ is used to control the direction of the active power flow. Phase shifts $\varphi_p$ and $\varphi_s$ can be generated using PI or PID controllers; PID$_1$ and PID$_2$. If $V_{DC(WPT)\_adap}^* > V_{DC(PQCC)}^*$, the BD-WPT module is operated at full duty cycle with $\varphi_p = \varphi_s = 180°$. In contrast, if $V_{DC(WPT)\_adap}^* \leq V_{DC(PQCC)}^*$, then active power $P_V$ is regulated at its reference $P_V^*$ by controlling $\varphi_p$ and $\varphi_s$ to be within $\leq 180°$.

Simulations have been performed to validate the proposed concept, and Table 1 shows the parameters used for the validation.

TABLE 1

| System | Parameter | Value |
|---|---|---|
| AC gird | $V_G$, $f_{sys}$ | 65 V, 50 Hz |
| PQCC | $L_c$, $C_c$ | 10 mH, 10 μF |
|  | $f_{sw}$ | 10 kHz |

TABLE 1-continued

| System | Parameter | Value |
|---|---|---|
| BD-WPT module | $C_{DC}$ | 660 μF |
|  | $V_{DC}$ | Adaptively controlled |
|  | $L_{pi}$ (or $L_{si}$) | 193 μH |
|  | $C_{pi}$ (or $C_{si}$) | 0.195 μF |
|  | $V_{out}$ | 130 V |
|  | M, k | 59.5 × 10 μH, 0.31 |
|  | $f_s$ | 85 kHz |

FIGS. 9A-9C show the dynamic performance of the proposed VW-VGH-PI system under different modes.

FIG. 9A shows the proposed VW-VGH-PI system is transferring from VG2H mode to the islanding mode at t=80 ms. Initially the system operates in the VG2H mode, and the grid side power factor and total harmonic distortion, given as $PF_G$ and $THD_{iG}$, are controlled to be unity and <5% while transferring active power $P_V$ of 250 W from the EV to the grid through PQCC to meet the load demand of $i_L$=7.5 A with a reduced grid current of 3.3 A. In the islanding mode (without the grid supply) $v_G$ is generated by the proposed system through the proposed voltage controller. As the AC grid side does not supply any power, the PQCC current $i_c$ is equal to $i_L$, and the load demand is met by the EV through PQCC.

FIG. 9B shows the transition of the proposed VW-VGH-PI system from the APF mode to the G2VH mode at t=80 ms. As expected, $PF_G$ and $THD_{iG}$ are maintained at unity and <5% by PQCC. In APF mode, since the reactive and harmonic powers of the load are compensated, the grid current $i_G$ is 4.2 A and is smaller than the required 6.9 A load current $i_L$. In contrast, in G2VH mode, EV demand is met by the grid, transferring active power $P_V$ of 250 W to the EV side. Hence the grid current is increased to $i_G$=9.2 A.

FIG. 9C shows the transition of the proposed VW-VGH-PI system from the V2HG mode to the V2H mode at t=80 ms. As expected, PQCC maintains $PF_G$ and $THD_{iG}$ at unity and <5%. Initially in the V2HG mode, PQCC transfers active power $P_V$ of 440 W from the EV to fully support the home load $P_L$=210 W, while injecting surplus active power to the grid. Then in the V2H mode with the absence of the grid power, PQCC uses the EV to fully support the load power requirement.

FIGS. 10A-10D and FIGS. 11A-11D show the dynamic waveforms of the proposed VW-VGH-PI system with adaptive DC-link voltage-control under G2VH and VG2H modes, respectively. In FIG. 10A, the reference $P_V^*$ is changed from 200 W to 350 W at t=0.2 s. Despite the change, PQCC maintains $PF_G$ and $THD_{iG}$ at unity and lower than 3%. To meet the increased in EV active power demand, the grid current is increased from $i_G$=10.1 A to 12.2 A while meeting the active and reactive power demand of the load. FIG. 10B shows the increased voltage and current in the BD-WPT module that corresponds to the power increase. FIGS. 10C and 10D illustrate how the soft-switching operation is achieved with the proposed adaptive DC-link voltage control.

FIG. 11A shows the waveforms during the active power $P_V$ injection to grid from the EV is changed from 200 W to 350 W. Throughout the operation, PQCC maintains $THD_{iG}$ and $PF_G$ at unity and <4.6% with a load power factor $PF_L$=0.780. With the injection of 350 W $P_v$, the grid current $i_G$ reduces to 2.7 A from 4.6 A. FIGS. 11C and 11D show how the dc link voltage is changed from 150 V to 220 V by the adaptive controller of PQCC in accordance with the increased power flow, while facilitating near soft-switch operation.

As shown in FIGS. 11A-11D, the input and output voltage and current waveforms in BD-WPT module can be controlled by proposed control method.

Although embodiments of the invention have been described with particular application to electric vehicles, those skilled in the art will appreciate that alternative fields of application comprise, for example, portable electronic devices such as cell phones, watches, tooth brushes, and the like.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time. Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method of operating an electric charging apparatus comprising a first full bridge converter configured to convert a grid supply of a grid to a DC link and a primary full bridge converter connected to the DC link and configured to provide an output alternating current for use in charging a battery, the method comprising:
providing a bi-directional wireless coupling between the primary full bridge converter and the battery;
detecting a charging power requirement for the battery;
determining a required voltage for the DC link to enable the primary full bridge converter to supply power satisfying the charging power requirement when the primary full bridge converter is operating at full duty cycle;
operating the primary full bridge converter at full duty cycle;
controlling voltage of the DC link to the required voltage;
controlling the primary full bridge converter and a secondary full bridge converter associated with the battery to control bi-directional wireless power transfer between the grid, a grid load connected thereto, and the battery;
operating the primary full bridge converter and the secondary full bridge converter at a relative phase angle (θ) to direct power flow to or from the battery, with the relative phase angle (θ) being a relative phase angle between respective voltages produced by the primary and secondary full bridge converters; and
wirelessly charging the battery.

2. The method of claim 1, further comprising supplying output of the primary full bridge converter to a coil for coupling to a further coil for inductive coupling to enable wireless power transfer.

3. The method of claim 1, further comprising:
detecting a reactive power requirement of the grid load, and
operating the first full bridge converter to compensate for the reactive power requirement.

4. The method of claim 1, further comprising:
detecting a power requirement of the grid or the grid, and
operating the first and primary full bridge converters to supply power from the battery to the grid load and/or the grid.

5. The method of claim 1, further comprising operating a duty cycle (φp) of the primary full bridge converter at 180 degrees.

6. The method of claim 1, further comprising operating a duty cycle (φs) of the full bridge secondary converter to control power flow.

7. The method of claim 1, further comprising:
calculating an instantaneous load power for a load connected to the grid,
determining a reference current for supply by the first full bridge converter, and
controlling switches of the first full bridge converter to provide compensation.

8. A battery-grid-home interface comprising
a controller configured or operable to perform the method according to claim 1.

9. The method of claim 1, wherein the relative phase angle θ is +90 degrees or −90 degrees.

10. The method of claim 1, wherein the battery comprises an electric vehicle battery.

11. A power and quality control converter comprising:
a first full bridge converter configured to provide, from a grid supply of a grid, a DC voltage from which a primary full bridge converter is to provides an output alternating current for use in charging a battery; and
a controller associated with the first full bridge converter and adapted to be associated the primary full bridge converter, and configured to:
provide a bi-directional wireless coupling between the primary full bridge converter and the battery;
detect a power requirement of the grid supply or a grid load connected to the grid;
determine an instantaneous value for the DC voltage to enable the primary full bridge converter to supply power satisfying an associated charging power requirement at full duty cycle;
operate the primary full bridge converter at full duty cycle;
adaptively control the first full bridge converter to enable the DC voltage to correspond to the determined instantaneous value;
control the primary full bridge converter and a secondary full bridge converter associated with the battery to control bi-directional wireless power transfer between the grid, the grid load, and the battery;
operate the primary full bridge converter and the secondary full bridge converter at a relative phase angle ($\theta$) to direct power flow to or from the battery, with the relative phase angle ($\theta$) being a relative phase angle between respective voltages produced by the first full bridge converter and the primary full bridge converter; and
wirelessly charge the battery.

12. The power and quality control converter of claim 11, wherein the controller is further configured to:
detect a reactive power requirement of the grid load, and
operate the first full bridge converter to compensate for the reactive power requirement.

13. The power and quality control converter of claim 11, wherein the controller is further configured to:
calculate an instantaneous load power for the grid load,
determine a reference current for supply by the first full bridge converter based on the calculated instantaneous load power, and
control switches of the first full bridge converter to provide compensation based on the determined reference current.

14. A method of operating an electric charging apparatus comprising: a first full bridge converter configured to provide from a grid supply of a grid a DC link voltage; and a primary full bridge converter configured to provide from the DC link voltage an output alternating current for use in charging a battery to be associated with the apparatus, the method comprising:
providing a bi-directional wireless coupling between the primary full bridge converter and the battery;
determining a required value for the DC link voltage to cause the output alternating current provided by the primary full bridge converter at full duty cycle to have a power satisfying a detected charging power requirement of the battery;
controlling the first full bridge converter to cause the DC link voltage to correspond to the required value;
controlling the primary full bridge converter to operate at full duty cycle;
controlling the primary full bridge converter and a secondary full bridge converter associated with the battery to control bi-directional wireless power transfer between the grid, a grid load connected thereto, and the battery;
operating the primary full bridge converter and the secondary full bridge converter at a relative phase angle ($\theta$) to direct power flow to or from the battery, with the relative phase angle ($\theta$) being a relative phase angle between respective voltages produced by the primary and secondary full bridge converters; and
wirelessly charging the battery.

* * * * *

UNITED STATES PATENT AND TRADEMARK OFFICE
CERTIFICATE OF CORRECTION

| | | |
|---|---|---|
| PATENT NO. | : 12,316,121 B2 | Page 1 of 1 |
| APPLICATION NO. | : 17/592952 | |
| DATED | : May 27, 2025 | |
| INVENTOR(S) | : Udaya Kumara Madawala and Lei Wang | |

It is certified that error appears in the above-identified patent and that said Letters Patent is hereby corrected as shown below:

In the Claims

Claim 6, Column 14, Line 37, please replace "duty cycle (ϕs)" with --duty cycle (φs)--

Signed and Sealed this
Twenty-fourth Day of June, 2025

Coke Morgan Stewart
*Acting Director of the United States Patent and Trademark Office*